(12) United States Patent
Lundgren

(10) Patent No.: US 7,245,347 B2
(45) Date of Patent: Jul. 17, 2007

(54) VARIABLE APERTURE STOP WITH NO MOVING PARTS

(75) Inventor: Mark A. Lundgren, Corona, CA (US)

(73) Assignee: The Boeing Company, Chicago, IL (US)

( * ) Notice: Subject to any disclaimer, the term of this patent is extended or adjusted under 35 U.S.C. 154(b) by 268 days.

(21) Appl. No.: 10/394,931

(22) Filed: Mar. 19, 2003

(65) Prior Publication Data

US 2004/0183965 A1    Sep. 23, 2004

(51) Int. Cl.
    *G02F 1/13*    (2006.01)
(52) U.S. Cl. ...................................... 349/200
(58) Field of Classification Search .............. 349/24, 349/33, 193, 200; 359/738–740
    See application file for complete search history.

(56) References Cited

U.S. PATENT DOCUMENTS

| 3,955,208 | A | * | 5/1976 | Wick et al. | ............... | 396/506 |
| 4,561,731 | A | * | 12/1985 | Kley | ............... | 349/1 |
| 4,679,911 | A | * | 7/1987 | Jacobs et al. | ............... | 349/200 |
| 4,833,314 | A |  | 5/1989 | Pepper et al. | ............... | 250/201 |
| 5,281,797 | A | * | 1/1994 | Tatsuno et al. | ............... | 250/201.5 |
| 5,619,266 | A | * | 4/1997 | Tomita et al. | ............... | 348/363 |
| 5,686,979 | A |  | 11/1997 | Weber et al. | ............... | 349/96 |
| 5,847,787 | A | * | 12/1998 | Fredley et al. | ............... | 349/89 |
| 6,577,376 | B1 | * | 6/2003 | Shih | ............... | 349/202 |

OTHER PUBLICATIONS

Switchable Window; Principal Investigators—J.W. Doane and John L. West (http://www.lci.kent.edu/researcher.html).

Polytronix, Inc. website; http://www.polytronix.com/pdlc.htm and http://www.polytronix.com/pdlc_ts.htm; Jan. 8, 2003.

* cited by examiner

*Primary Examiner*—Toan Ton
(74) *Attorney, Agent, or Firm*—Harness, Dickey & Pierce, P.L.C.

(57) ABSTRACT

A variable aperture stop with no moving parts is disclosed. The aperture stop comprises a first region comprising a first optically transmissive medium, a second region comprising a second optically transmissive medium, and an electro-optical structure adapted to selectively switch the second region between a first state of optical transmissivity and a second state of optical transmissivity upon application of an electric potential thereto. The electro-optical structure comprises a top optically transmissive conductor, a bottom optically transmissive conductor positioned below and parallel to the top conductor so as to define a space therebetween, the space including the first region and the second region, and an electric voltage applicator coupled to the top conductor and adapted to apply an electric voltage to the top conductor that creates the electric potential between the top and bottom conductors.

An apodizable, variable aperture stop with no moving parts is also disclosed. The aperture stop comprises a conductor having a perimeter, and an electro-optical structure coupled to the conductor. The electro-optical structure defines a first region within the perimeter of the conductor and is adapted to selectively switch the first region between a first state of optical transmissivity and a second state of optical transmissivity upon application of an electric potential thereto. The aperture stop produces an aperture having variable, optically transmissive regions representing an apodization when the first region is in the second state of optical transmissivity. Methods for manufacturing both aperture stops are also disclosed.

21 Claims, 6 Drawing Sheets

VARIABLE APERTURE STOP WITH NO MOVING PARTS

CROSS REFERENCE TO RELATED APPLICATIONS

None.

STATEMENT REGARDING FEDERALLY SPONSORED RESEARCH OR DEVELOPMENT

None.

BACKGROUND

The present disclosure relates to aperture stops in general and in particular, to a variable, apodizable aperture stop with no moving parts.

Optical devices such as cameras, video recorders, telescopes and satellites include an aperture stop that controls the amount of light passing through the lens of the device. The size of the aperture is typically controlled by mechanical means. For example, in the case of a camera, the lens' diaphragm may be made from thin metal blades that overlap. A rotatable aperture control ring is fitted around the barrel of the lens, and the blades move smoothly toward or away from the center of the lens upon rotation of the control ring, which in turn results in the aperture being reduced or enlarged in radius. Alternatively, a movable sheet having a plurality of apertures of different sizes may be placed in front of the lens to achieve the desired aperture size. With such a configuration, however, the number and range of aperture sizes available is necessarily limited.

As with all mechanical devices, such mechanical aperture stops are subject to wear and tear and thus have a limited life. For the same reasons, they often are prone to becoming unreliable, which is especially problematic in space applications where faulty aperture stops cannot be easily or quickly serviced. In the case where repair or replacement of the aperture stop is not possible, the optical device is rendered useless. Mechanical aperture stops are also vulnerable to environmental disturbances such as high shock or vibration and temperature variations, which is especially problematic in harsh environments like space. In addition, due to the mechanical nature of such aperture stops, movement of the optical device in which they are placed is often inevitable, which has an adverse affect on the quality of the images produced. This is especially problematic in applications in which movement of the optical device cannot be tolerated such as in space, where focus may not be adjustable.

Another significant problem associated with mechanical aperture stops is the occurrence of diffraction at the sharp edges of the aperture. When observing space scenes, the excessive glare resulting from such diffraction is especially problematic. The size of mechanical aperture stops also makes them unsuitable for applications requiring a high degree of miniaturization. In today's technological world where smaller is better, such aperture stops are highly undesirable.

Accordingly, there is a need for a variable, apodizable aperture stop having no moving parts.

SUMMARY

A variable aperture stop is disclosed which comprises a first region comprising a first optically transmissive medium, a second region comprising a second optically transmissive medium, and an electro-optical structure adapted to selectively switch the second region between a first state of optical transmissivity and a second state of optical transmissivity upon application of an electric potential thereto. The electro-optical structure comprises a top optically transmissive conductor, a bottom optically transmissive conductor positioned below and parallel to the top conductor so as to define a space there between, the space including the first region and the second region, and an electric voltage applicator coupled to the top conductor and adapted to apply an electric voltage to the top conductor that creates the electric potential between the top and bottom conductors. The first region defines a first aperture, and the first and second regions define a second aperture when the second region is in the second state of optical transmissivity, the second aperture being larger than the first aperture. In one embodiment, the first optically transmissive medium is air, and the second optically transmissive medium is made up of liquid crystals.

A variable, apodizable aperture stop is also disclosed. The variable, apodizable aperture stop comprises a conductor having a perimeter, and an electro-optical structure coupled to the conductor and defining a first region within the perimeter of the conductor, the electro-optically transmissive structure adapted to selectively switch the first region between a first state of optical transmissivity and a second state of optical transmissivity upon application of an electric potential thereto, the aperture stop producing an aperture having variable, optically transmissive regions representing an apodization when the first region is in the second state of optical transmissivity. The electro-optical structure comprises a top, optically transmissive conductor to which the conductor is coupled, the top conductor having a resistivity, a bottom, optically transparent conductor positioned below and parallel to the top conductor so as to define a space there between, an electro-optical medium dispersed within the space, and an electric voltage applicator coupled to the top conductor and adapted to apply an electric voltage to the top conductor. The electric voltage applicator comprises means for varying the electric voltage being applied to the top conductor so that the degree of apodization can be selectively varied. In one embodiment, the conductor is in the shape of an annular ring, and the electro-optical medium is made up of liquid crystals.

A method of manufacturing a variable aperture stop is also disclosed. The method comprises providing a top, optically transmissive conductor, positioning a bottom, optically transmissive conductor below and parallel with the top conductor so as to define a space there between, the space defining a first region and a second region, dispersing an electro-optical medium within the second region of the space, and connecting an electric voltage applicator to the top conductor, the electric voltage applicator being adapted to apply an electric voltage to the top conductor such that the second region can be selectively switched between a first state of optical transmissivity and a second state of optical transmissivity.

A method of manufacturing a variable, apodizable aperture stop is also disclosed. The method comprises providing a top, optically transmissive conductor having a top surface, the top conductor having a resistivity, coupling a conductor having a perimeter to the top surface of the top conductor, positioning a bottom, optically transmissive conductor below and parallel to the top conductor so as to define a space therein, the space having a first region within the perimeter of the conductor, dispersing an electro-optical medium within the first region of the space, and connecting an electric voltage applicator to the top conductor, the electric voltage applicator being adapted to apply an electric voltage to the top conductor, such that the first region can be selectively switched between a first state of optical transmissivity and a second state of optical transmissivity, the aperture stop producing an aperture having variable, optically transmissive regions representing an apodization within the first region when the first region is in the second state of optical transmissivity. The electric voltage applicator comprises means for varying the electric voltage applied to the top conductor such that the degree of apodization may be selectively varied.

DETAILED DESCRIPTION OF THE VARIOUS EMBODIMENTS

Figure 1:
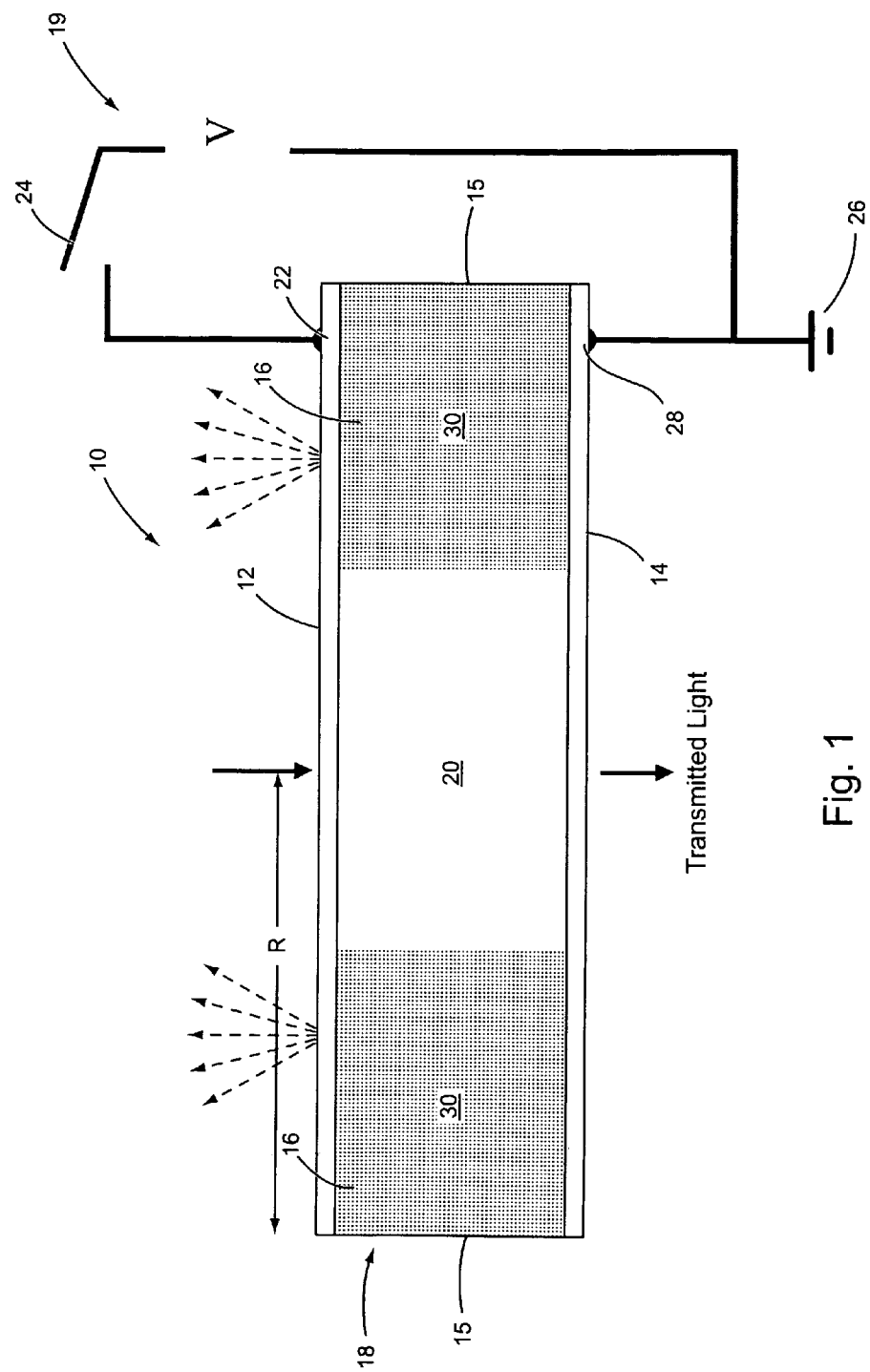
FIG. 1 is a cross-sectional view of an aperture stop in accordance with one embodiment of the present disclosure.
Figure 2:
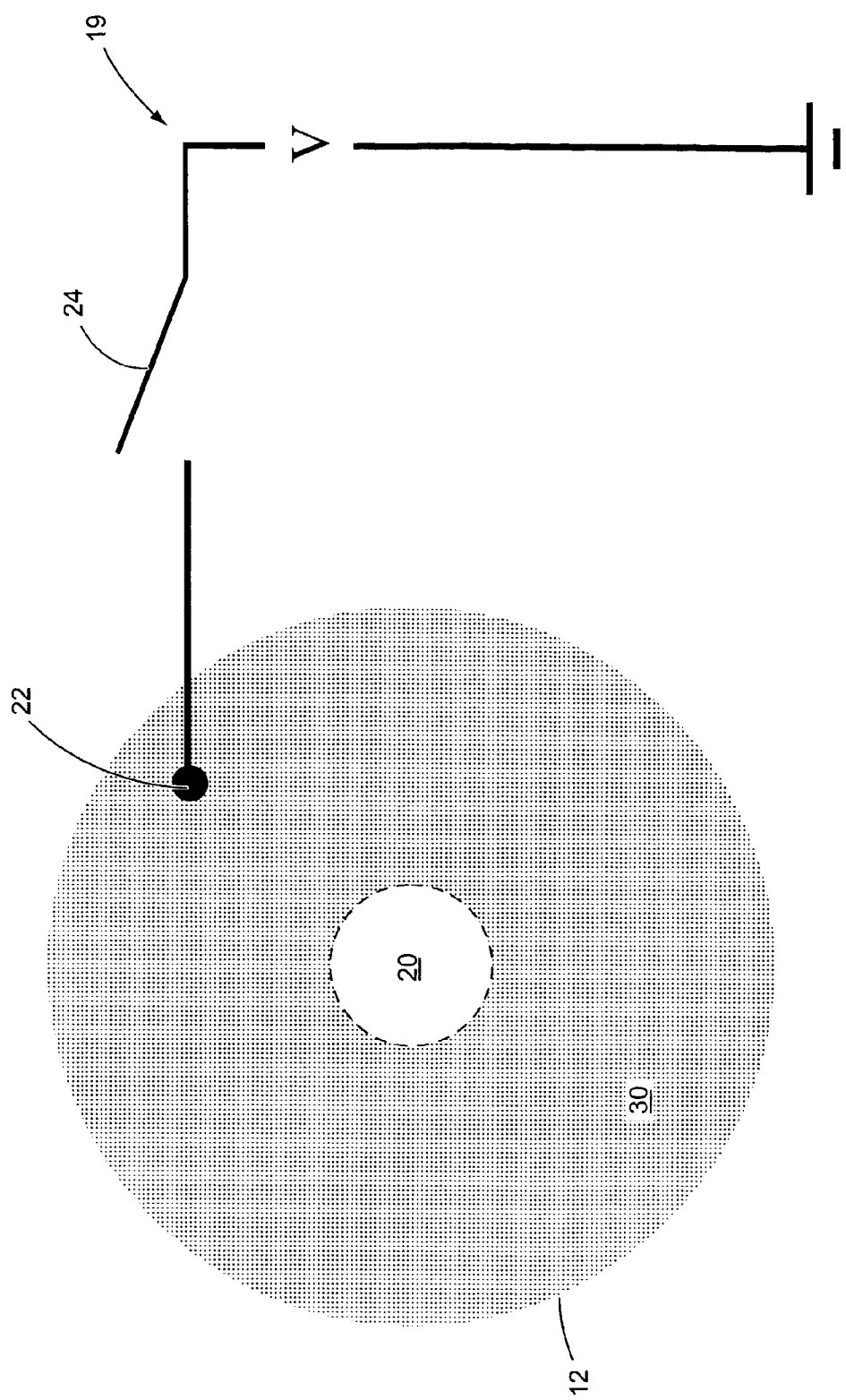
FIG. 2 is a top view of the aperture stop of FIG. 1.
Figure 3:
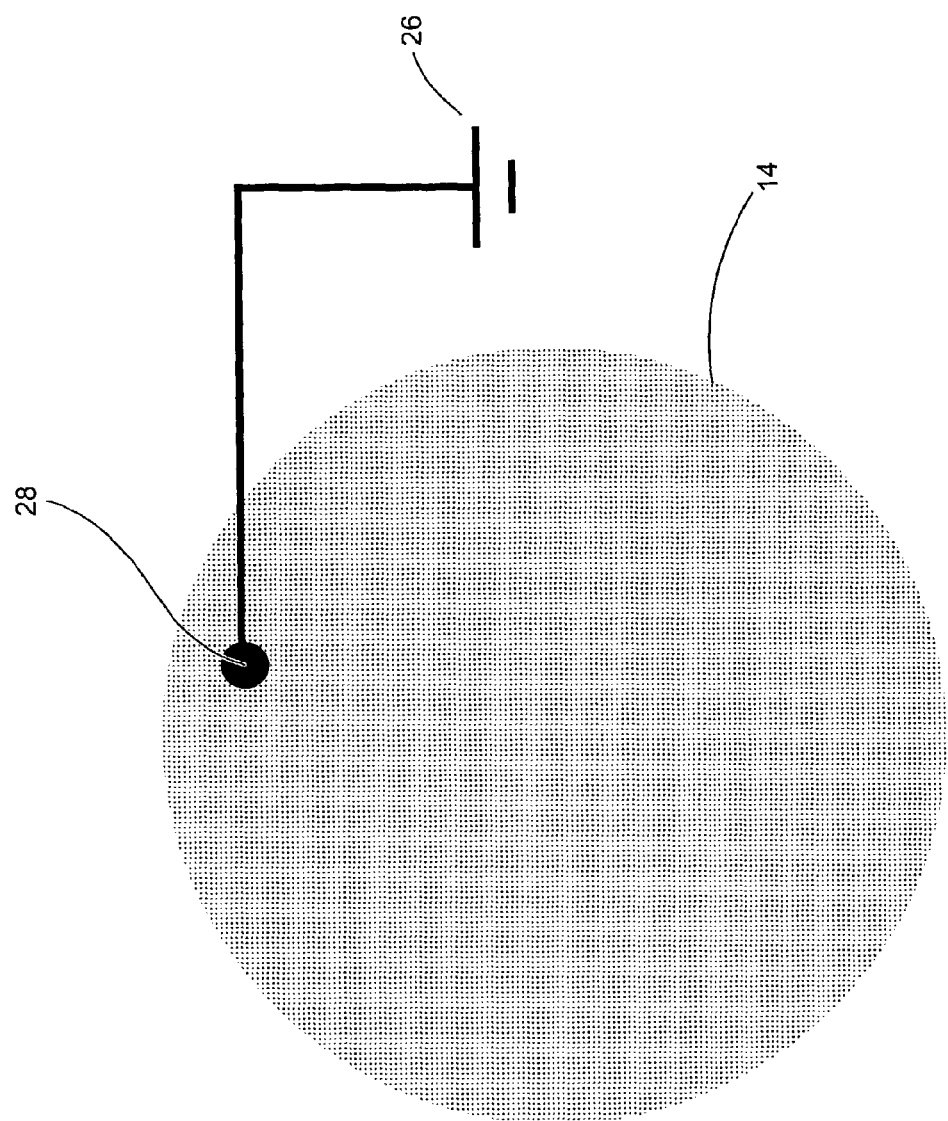
FIG. 3 is a bottom view of the aperture stop of FIG. 1.

An aperture stop in accordance with one embodiment of the present invention is disclosed in FIGS. 1–3. With reference to FIG. 1, the aperture stop 10 has a radius, R, and comprises a top conductor 12, a bottom conductor 14 positioned below and parallel to the top conductor 12, and a wall 15 connecting the top and bottom conductors 12 and 14. The top and bottom conductors 12 and 14 can be made of any optically transmissive material that allows light to pass through it. An electro-optical medium 16 is dispersed in a space 18 defined by the top conductor 12, the bottom conductor 14 and the wall 15. In an embodiment, the medium 16 is a liquid crystal medium and the disclosure will be discussed with respect to a liquid crystal medium. However, medium 16 can be any electro-optical material capable of changing its optical transmission upon application of an electric field, magnetic field or other energy source including, for example, a dielectric material, an electro-chromic material, a photochromic material or thermochromic material.

The space 18 defines a first region 20 comprising an optically transmissive medium through which light can pass, and a second region 30 capable of switching between a first state of optical transmissivity and a second state of optical transmissivity as further described herein. Medium 16 is thus only present in the second region 30 of space 18. While the first region 20 is shown in the center of the aperture stop 10 and the second region 30 is shown concentric therewith and peripheral thereto, it can appreciated that the first and second regions 20 and 30 can be positioned anywhere within the aperture stop 10. In addition, the radius of the first region 20 and the radius of the aperture stop 10 can be increased or decreased depending on the needs of the application for which it is being used. Further, while the first region 20 is shown as a vacuum or hole, it can be appreciated that it can be any optically transmissive medium.

Means 19 are provided for applying electrical voltage, V, across the top conductor 12 that forms a potential between the top and bottom conductors 12 and 14, respectively. With further reference to FIG. 2, the means 19 is connected to the top conductor 12 at a point 22 via a switch 24. The switch 24 is adapted to switch second region 30 between the first and second states of optical transmissivity. As shown in FIG. 3, bottom conductor 14 is connected to ground 26 at a point 28. It is understood by one skilled in the art that points 22 and 28 can be anywhere on the top surface of top conductor 12 or the bottom surface of bottom conductor 14, respectively.

When switch 24 is in an open position as shown in FIG. 1, no electrical voltage is applied to the top conductor 12 and thus, no potential is formed between the top and bottom conductors 12 and 14, respectively. As a result, no electric field is generated through the medium 16 in the second region 30. Without an electric field, the liquid crystals of the medium 16 are randomly oriented, thereby causing light to scatter off the surface of top conductor 12 above the second region 30 and create an opaque, first state of optical transmissivity therein. With such a configuration, light only passes through the first region 20 thereby creating a first aperture.

When switch 24 is closed (not shown), an electrical voltage, V, is applied across top conductor 12 that forms a potential between the top conductor 12 and the bottom conductor 14. As a result, an electric field is generated through the medium 16 in the second region 30. This in turn causes the liquid crystals in medium 16 to align parallel to the electric field, thereby allowing light to pass through the second region 30 and creating a transparent second state of optical transmissivity therein. As a result, a second and larger aperture having a radius the same as the radius, R, of the aperture stop 10 is produced. Like the first aperture, the size of the second aperture can be increased or decreased depending on the needs of the application for which it is being used. In an embodiment, the optical path difference through the first and second regions is near zero in order to avoid causing aberrations.

Figure 4:
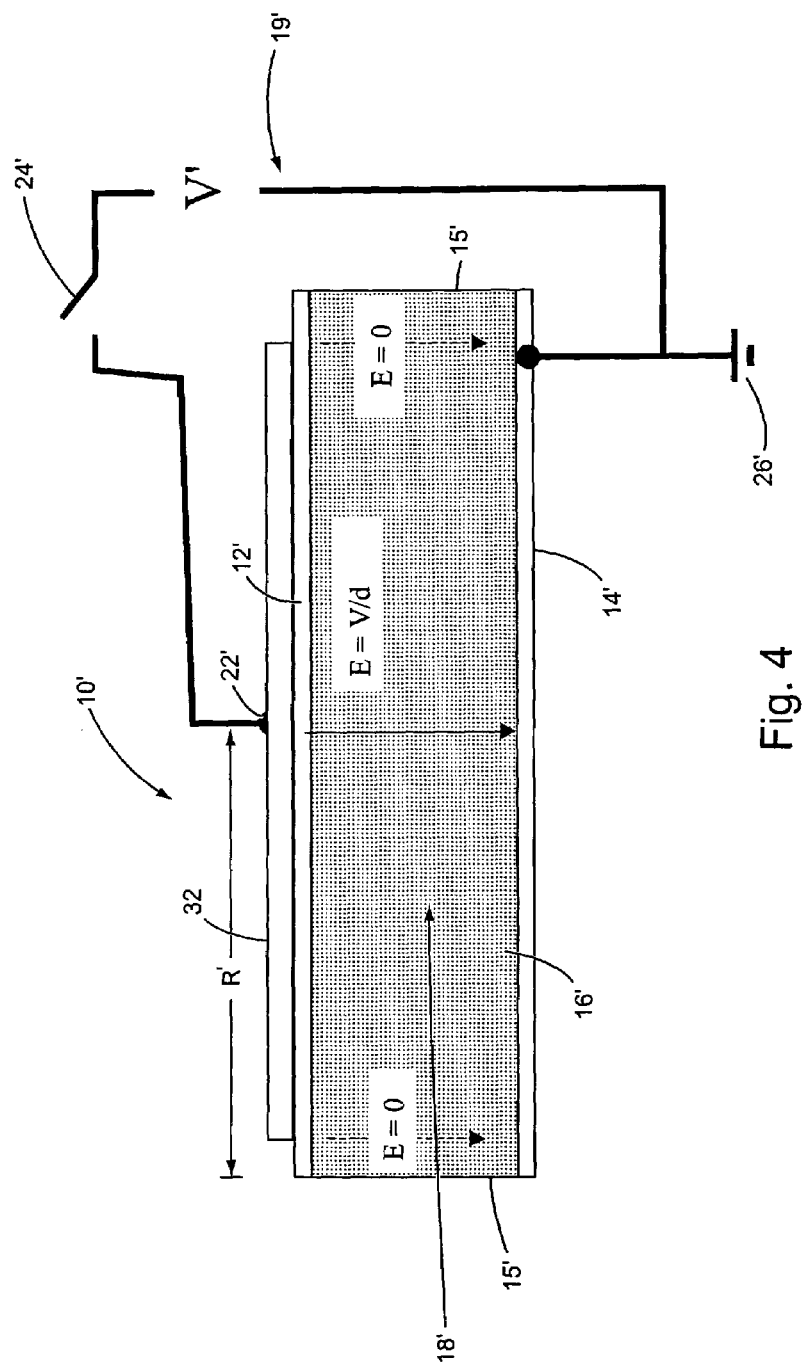
FIG. 4 is a cross-sectional view of an aperture stop in accordance with another embodiment of the present disclosure.
Figure 5:
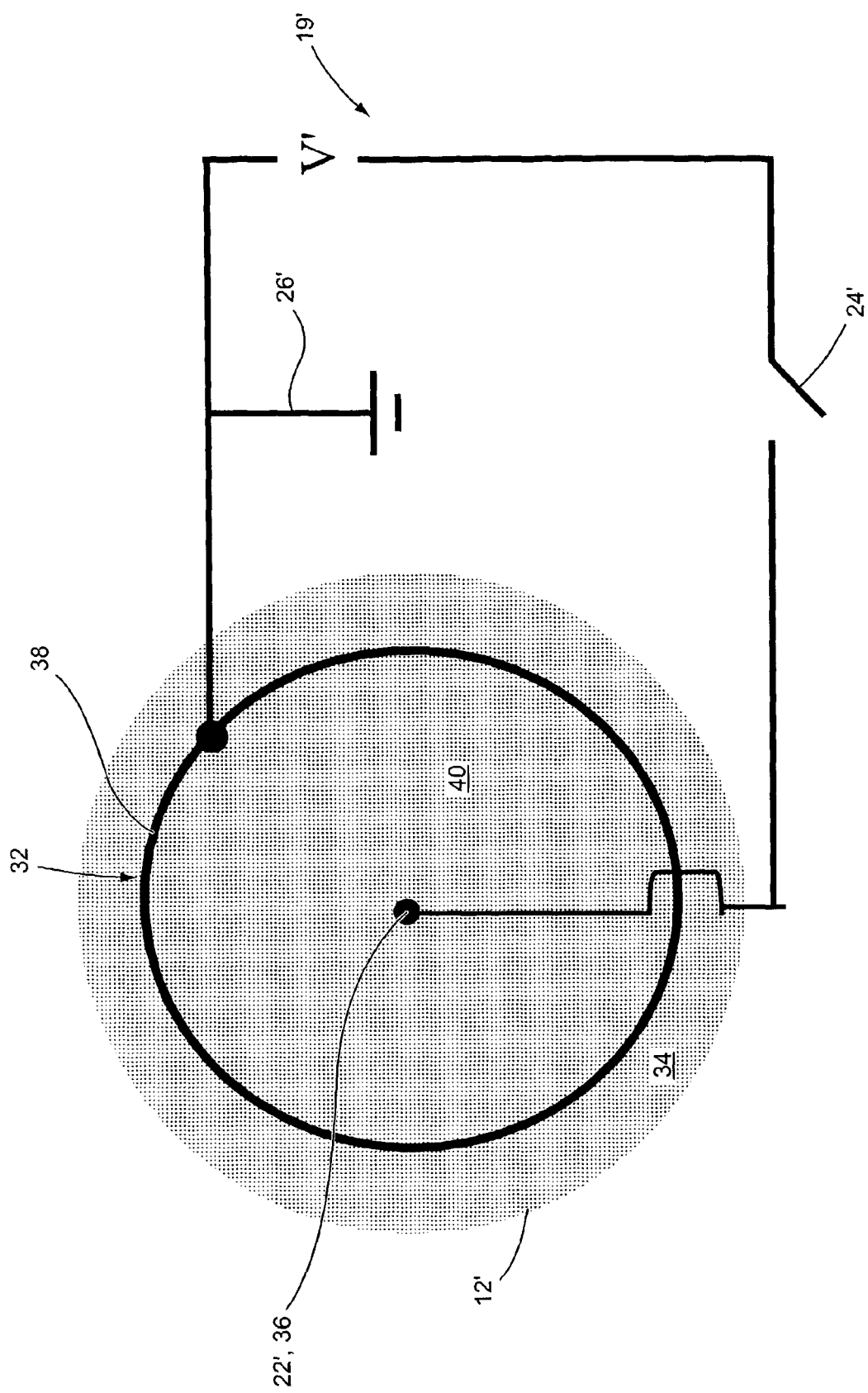
FIG. 5 is a top view of the aperture stop of FIG. 4.

An aperture stop 10' in accordance with another embodiment of the present disclosure is disclosed in FIGS. 4 and 5. Like aperture stop 10, aperture stop 10' has an optically transmissive top conductor 12', an optically transmissive bottom conductor 14' positioned below and parallel with the top conductor, and a wall 15' connecting the top and bottom conductors 12' and 14'. Again, the top and bottom conductors 12' and 14' can be made of any optically transmissive material that allows light to pass through it. The top conductor 14' has a resistivity, rho which is preferably significant but at the very least greater than zero.

An electro-optical medium 16' is dispersed in a space 18' defined by the top conductor 12', the bottom conductor 14 and the wall 15'. The medium 16' can be any electro-optical material or structure capable of changing its optical transmission upon application of an electric field, magnetic field or other energy source including, for example, a dielectric material, an electro-chromic material, a photochromic material or a thermochromic material. For the purposes of discussion only, however, the medium 16' will be described as a liquid crystal medium. While the medium 16' is shown as being dispersed throughout the entire space 18', it can be appreciated that it can be dispersed in first and second regions as described herein and as shown in FIG. 1.

Figure 6:
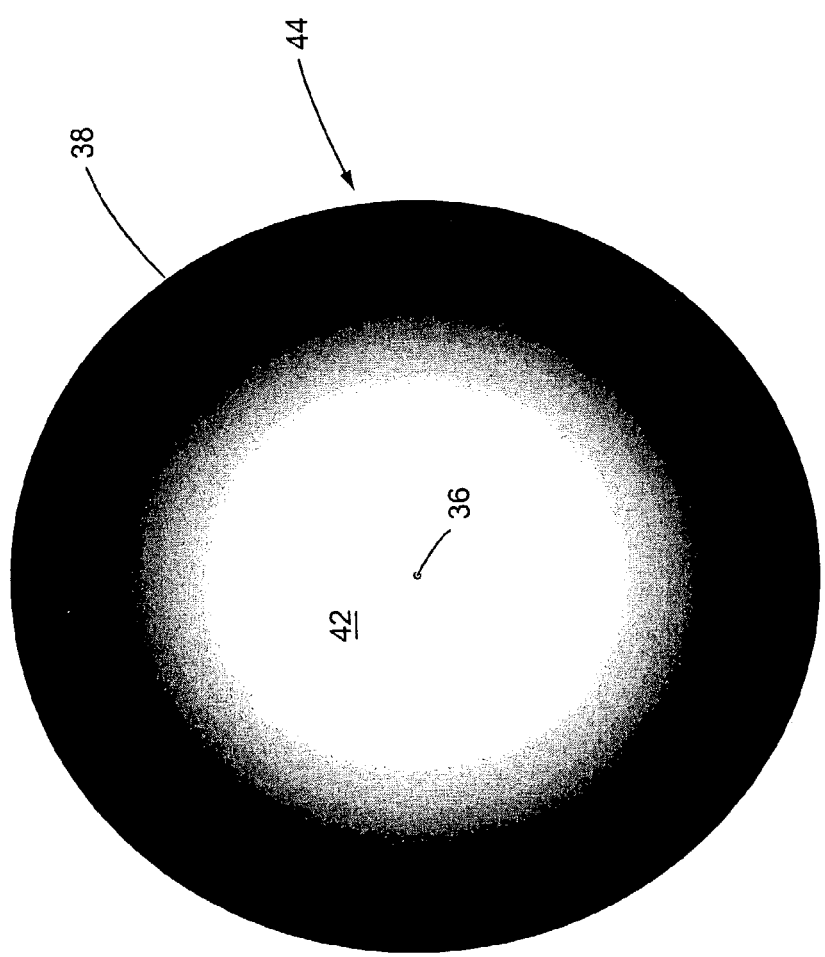
FIG. 6 is a top view of the aperture stop of FIG. 4 in an apodizable state.

As best shown in FIG. 5, aperture stop 10' includes a conductor 32 coupled to the top conductor 12' and connected to a ground source 26'. The conductor 32 can be coupled to the top conductor 12' in any number of known ways, such as for example through metalization, deposition, or photoetching. With further reference to FIG. 6, the conductor 32 has a center 36 which is concentric with the center of the aperture stop 10', and a perimeter 38 which defines a first region 40 of optical transmissivity within the medium 16' and a second region 34 within medium 16' (as shown in FIG. 5). While the conductor 32 is shown in the form of an annular ring, it can be appreciated that the size and shape of the conductor 32 can vary depending on the application (e.g., rectangular, oval, irregular).

As in the case of the first embodiment, means 19' are provided for applying an electrical voltage, V, to the top conductor 12' which forms a potential between the top and bottom conductors, 12' and 14', respectively. In particular, the means 19' is connected to the top conductor 12' at a point 22' via a switch 24'. The switch 24' is adapted to switch the first region 40 between a first state of optical transmissivity and a second state of optical transmissivity as described further below. The point 22' is preferably at or substantially near the center of the aperture stop 10'.

When switch 24' is in an open position, no electrical voltage is applied to the top conductor 12' and thus no potential is formed between the top and bottom conductors 12' and 14'. As a result, no electric field is generated throughout the medium 16', which causes the liquid crystals therein to randomly orient. As such, light scatters off the entire top surface of top conductor 12' including the first region 40 so as to create an opaque state across the entire aperture stop 10'.

When switch 24' is in a closed position, a voltage, V top(R), is applied to the top conductor 12' at any point, R, within the perimeter 38 of the conductor 32 in accordance with the following equation:

$$V\,\text{top}(R) = V \times [(R0-R)/R0]^2$$

where V represents the voltage of the potential source, R0 represents the radius from the center 36 of conductor 32 to its perimeter 38 and R represents the radius from the center 36 of the conductor 32 to point R. As a result of the resistivity of top conductor 12', the potential across it varies radially from the center 36 to the perimeter 38 of conductor 32. This in turn results in the generation of an electric field through the first region 40 of medium 16' which likewise varies radially therein from the center 36 of conductor 32 to its perimeter 38 in accordance with the following equation:

$$E = V\,\text{top}(R)/d$$

where E represents the electric field generated within the medium 16' at point R, V top(R) represents the voltage of the top conductor 12' at point R, and d represents the distance between the top and bottom conductors 12' and 14'. This in turn causes the liquid crystals in the first region 40 of medium 16' to align parallel to the electric field and allows light to pass through the first region thereby creating a second state of optical transmissivity therein. In particular, an aperture 44 having variable, (and in this case circular) optically transmissive regions is produced within the first region 40 as shown in FIG. 6. The aperture 44 includes a region 42 through which all of the light hitting top conductor 12' passes. The size of the region 42 and the degree of apodization surrounding this region can be selectively and automatically controlled by varying the voltage, V, of the means 19'.

Given that the conductor 32 is connected to the ground source 26', the top conductor 12' never has a potential outside the perimeter 38 of conductor 32, and thus no electric fields are generated within the second region 34 of the medium 16'. This causes the liquid crystals in the second region 34 in medium 16' to always randomly orient and as such, light scatters off the top surface of top conductor 12' outside the perimeter 38 of conductor 32 so as to always create an opaque state outside the first region 40.

With both of the above-mentioned embodiments, a variable aperture stop requiring no moving parts is achieved. In the case of the latter embodiment, a variable, apodizable such aperture stop is achieved. In addition, the aperture stop of the present disclosure can eliminate the need for focus drives in optical systems that would otherwise require them to prevent blurring. This is advantageous given that most focus drives involve a complicated mechanical assembly made up of several moving parts and typically require installation by a qualified technician.

While the disclosure has been illustrated and described in connection with several preferred embodiments, it will be appreciated that further changes can be made therein without departing from the spirit and scope of the disclosure. For example, while the disclosure has been discussed with reference to various optical devices such as cameras, video recorders, telescopes and satellites, it applies to any optical or imaging system, including without limitation those for use in space applications. Accordingly, it is intended that the scope of the disclosure not be limited by the disclosure of the preferred embodiments, but instead be determined entirely by reference to the claims that follow.

I claim:

1. A variable, apodizable aperture stop, comprising:
    a conductor having a perimeter; and
    an electro-optical structure coupled to the conductor and defining a first region within the perimeter of the conductor, the electro-optically structure selectively switches the first region between a first state of opaque, optical non-transmissivity and a second state of optical transmissivity upon application of an electric potential thereto to produce the aperture stop with an aperture having variable, optically transmissive regions representing an apodization when the first region is in the second state of optical transmissivity.

2. The aperture stop of claim 1, wherein the electro-optical structure comprises:
    a top, optically transmissive conductor to which the conductor is coupled, the top conductor having a resistivity;
    a bottom, optically transparent conductor positioned below and parallel to the top conductor so as to define a space therebetween;
    an electro-optical medium dispersed within the space; and
    an electric voltage applicator coupled to the top conductor to apply an electric voltage to the top conductor.

3. The aperture stop of claim 2, wherein the electric voltage applicator comprises means for varying the electric voltage being applied to the top conductor so that the degree of apodization can be selectively varied.

4. The aperture stop of claim 1, wherein the conductor is in the shape of an annular ring.

5. The aperture stop of claim 2, wherein the electro-optical medium is made up of liquid crystals.

6. The aperture stop of claim 5, wherein the liquid crystals comprise polymeric dispersed liquid crystals.

7. The aperture stop of claim 2, wherein the electric voltage applicator comprises a switch adapted to switch the electric voltage applicator between an open and closed position such that the electric voltage is applied to the top conductor when the switch is in a closed position, and no electric voltage is applied to the top conductor when the switch is in an open position.

8. The aperture stop of claim 2, wherein in the first state of optical transmissivity light scatters off the electro-optical medium.

9. The aperture stop of claim 1, wherein the first state of optical transmissivity is opaque.

10. The aperture stop of claim 1, wherein the electro-optical structure defines a second region outside the perimeter of the conductor that is always in an opaque state.

11. The aperture stop of claim 1, wherein the electro-optical structure comprises:
  a top, optically transmissive conductor having a resistivity;
  a bottom, optically transparent conductor positioned below and parallel to the top conductor so as to define a space therebetween;
  an electro-optical medium dispersed within the space; and
  an electric voltage applicator coupled to the center of the top conductor and the perimeter of the conductor to apply an electric voltage to the top conductor, such that, based on the voltage applied, the top conductor carries a radially varying electric potential, and the electric voltage applicator coupled to the bottom conductor to apply a potential to the bottom conductor, such that a radially gradient electric field is formed between the top conductor and the bottom conductor in the electro-optical medium.

12. The aperture stop of claim 11, wherein the electric voltage applicator comprises means for varying the electric voltage being applied to the top conductor so that the degree of apodization can be selectively varied.

13. A method of manufacturing a variable, apodizable aperture stop, comprising:
  providing a top, optically transmissive conductor having a top surface, the top conductor having a resistivity;
  coupling a conductor having a perimeter to the top surface of the top conductor;
  positioning a bottom, optically transmissive conductor below and parallel to the top conductor so as to define a space therein, the space having a first region within the perimeter of the conductor;
  dispersing an electro-optical medium within the first region of the space; and
  connecting an electric voltage applicator to at least one of the top conductor, the conductor or the bottom conductor to apply an electric voltage to switch the first region between a first state of opaque, optical non-transmissivity and a second state of optical transmissivity to produce the aperture stop with an aperture having variable, optically transmissive regions representing an apodization within the first region when the first region is in the second state of optical transmissivity.

14. The method of claim 13, wherein the electric voltage applicator comprises means for varying the electric voltage applied to the top conductor such that the degree of apodization may be selectively varied.

15. The method of claim 13, wherein the electro-optical medium comprises liquid crystals.

16. The method of claim 15, wherein the liquid crystals comprise polymeric dispersed liquid crystals.

17. The method of claim 13, wherein the top conductor has a resistivity which is adapted to provide a radially gradient electric field in the electro-optical medium when the electric voltage is applied to the top conductor.

18. The method of claim 17, wherein the electric voltage applicator comprises means for varying the electric voltage applied to the top conductor such that the degree of apodization may be selectively varied.

19. A variable, apodizable aperture stop comprising:
  a top, optically transmissive conductor having a perimeter and a resistivity;
  a bottom, optically transparent conductor positioned below the top conductor to define a space therebetween;
  an electro-optical medium dispersed within the space that defines a first region within the perimeter with an opaque non-transmissive state and an optical transmissive state; and
  a voltage applicator coupled to at least the top conductor, the application of the voltage to the top conductor causes the electro-optical medium to switch from the opaque non-transmissive state to the optical transmissive state.

20. A method of manufacturing a valuable, apodizable aperture stop comprising:
  providing a top, optically transmissive conductor including a top surface;
  coupling a conductor to the top surface of the top conductor, the conductor defining a perimeter;
  positioning a bottom, optically transmissive conductor below the top conductor to define a space therebetween, the space defining a first region within the perimeter of the conductor;
  dispensing an electro-optical medium within the space;
  connecting a voltage applicator to the top conductor and the conductor to apply a voltage to the top conductor to switch the first region between a first opaque, optical non-transmissive state and a second optical transmissive state.

21. The method of claim 20, wherein the first region comprises air and the second region comprises liquid crystals.

* * * * *